(12) United States Patent
Nomura et al.

(10) Patent No.: US 9,010,468 B2
(45) Date of Patent: Apr. 21, 2015

(54) HYBRID VEHICLE DRIVING DEVICE

(75) Inventors: Akifumi Nomura, Wako (JP); Kenichi Ohmori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 49 days.

(21) Appl. No.: 13/403,111

(22) Filed: Feb. 23, 2012

(65) Prior Publication Data
US 2012/0217075 A1 Aug. 30, 2012

(30) Foreign Application Priority Data

Feb. 25, 2011 (JP) ................................. 2011-040402

(51) Int. Cl.
| | |
|---|---|
| *B60K 6/22* | (2007.10) |
| *B60K 6/48* | (2007.10) |
| *B60K 6/383* | (2007.10) |
| *B60K 6/547* | (2007.10) |
| *F16H 3/00* | (2006.01) |

(52) U.S. Cl.
CPC ............. *B60K 6/48* (2013.01); *Y10T 74/19051* (2015.01); *B60K 6/383* (2013.01); *B60K 6/547* (2013.01); *B60Y 2200/12* (2013.01); *B60Y 2400/428* (2013.01); *F16H 3/006* (2013.01); *Y02T 10/6221* (2013.01)

(58) Field of Classification Search
USPC .............................. 180/218, 220, 65.21, 65.22
See application file for complete search history.

(56) References Cited

U.S. PATENT DOCUMENTS

| | | | | |
|---|---|---|---|---|
| 6,109,127 | A * | 8/2000 | Liau ............................. | 74/336 B |
| 6,752,225 | B2 * | 6/2004 | Kojima ....................... | 180/65.25 |
| 7,392,870 | B2 * | 7/2008 | Kojima et al. ............. | 180/65.25 |
| 7,475,746 | B2 * | 1/2009 | Tsukada et al. ............ | 180/65.28 |
| 7,730,983 | B2 * | 6/2010 | Tanaka et al. ............. | 180/65.285 |
| 7,784,574 | B2 * | 8/2010 | Shirazawa et al. ........ | 180/65.265 |
| 8,047,321 | B2 * | 11/2011 | Martini et al. ............. | 180/220 |
| 8,056,663 | B2 * | 11/2011 | Schoenek ................... | 180/65.6 |
| 8,328,686 | B2 * | 12/2012 | Kobayashi et al. ........... | 477/79 |
| 2002/0170758 | A1 | 11/2002 | Shimabukuro et al. | |
| 2006/0180363 | A1 * | 8/2006 | Uchisasai et al. ........... | 180/65.2 |
| 2009/0078069 | A1 * | 3/2009 | Nedachi et al. ............ | 74/330 |
| 2010/0082210 | A1 * | 4/2010 | Kobayashi et al. .......... | 701/66 |
| 2010/0236856 | A1 | 9/2010 | Nomura et al. | |
| 2010/0317476 | A1 | 12/2010 | Schoenek | |

FOREIGN PATENT DOCUMENTS

| | | |
|---|---|---|
| EP | 0445873 | 11/1991 |
| JP | 3967309 | 6/2007 |

* cited by examiner

*Primary Examiner* — John Walters
*Assistant Examiner* — Brian Swenson
(74) *Attorney, Agent, or Firm* — Rankin, Hill & Clark LLP

(57) ABSTRACT

A hybrid vehicle driving device including an engine drive system transmitting a drive force of an engine to a transmission through a one-way clutch and transmitting a drive force after shifting by the transmission to a rear wheel and a motor drive system transmitting a drive force of a motor to the rear wheel, the drive force of the motor of the motor drive system is joined to a point upstream the transmission and downstream the one-way clutch in the engine drive system. The transmission includes a twin clutch capable of shifting between neighboring shift gears by alternately switching the connection state of a clutch on one side and a clutch on the other side, and is automatically shifted to produce an optional rotational speed and motor torque at which the electric power generation efficiency becomes high at the time of regeneration control of the motor.

10 Claims, 9 Drawing Sheets

(Motor Driving)

(Motor Regeneration Controlling)

HYBRID VEHICLE DRIVING DEVICE

BACKGROUND OF THE INVENTION

1. Field of the Invention

The present invention generally relates to a hybrid vehicle driving device and, more particularly, to a hybrid vehicle driving device for a hybrid vehicle making an engine and a motor cc-work as a drive source of the vehicle.

2. Description of Related Art

Hybrid vehicles making an engine and a motor co-work as a drive source of the vehicle are known in the art. A battery for supplying electric power to the motor is mounted on a vehicle body, and the vehicle is configured so as to further improve the energy efficiency by charging the battery by making the motor regenerate the electric power in decelerating, traveling on a descending slope, and the like.

In Japanese Patent No. 3967309, a configuration of a scooter type hybrid two-wheeled vehicle is disclosed in which an engine and a motor are stored in a unit swing that is swingably attached to a vehicle body frame and that pivotably supports a rear wheel. This hybrid two-wheeled vehicle is configured so that the drive force of the engine is transmitted to the rear wheel through a belt type continuously variable transmission, whereas the drive force of the motor disposed in the vicinity of an axle of the rear wheel is transmitted to the rear wheel without passing through the continuously variable transmission.

As described above, in the hybrid vehicles, although the energy efficiency can be improved by executing electric power regeneration using the motor as a generator in decelerating, traveling on a descending slope, and the like, it is known that the electric power generation efficiency in electric power regeneration is high in a specific rotational speed range according to the characteristics of the motor and becomes lower as the rotational speed departs from the specific rotational speed range. However, according to the technology described in Japanese Patent No. 3967309, because the speed reduction ratio between the motor and rear wheel is fixed, the rotational speed of the motor in regenerating charging is proportional to the rotational speed of the rear wheel, and it is not possible to execute regenerating charging positively selecting a rotational speed range where the electric power generation efficiency is high.

SUMMARY OF THE INVENTION

An object of the present invention is to solve the problems of the prior art and to provide a hybrid vehicle driving device capable of executing electric power regeneration at a rotational speed range where the electric power generation efficiency is high.

According to the present invention, a hybrid vehicle driving device includes an engine drive system transmitting a drive force of an engine to a transmission through a drive force connecting/disconnecting device and transmitting a drive force, after the speed is changed by the transmission, to a rear wheel. The hybrid vehicle also includes a motor drive system transmitting the drive force of a motor to the rear wheel, in which the drive force of the motor of the motor drive system is joined to a point upstream the transmission and downstream the drive force connecting/disconnecting device in the engine drive system.

Because the drive force of the motor of the motor drive system is joined to a point upstream the transmission and downstream the drive force connecting/disconnecting device in the engine drive system, hybrid travel is allowed in which the rotational drive force is transmitted to the rear wheel using only the engine or the motor, or both of the engine and the motor, and, at the time of regeneration control of the motor in deceleration and the like, it is allowed to change the speed of the rotational drive force inputted from the rear wheel by the transmission and to rotate the motor at an optional rotational speed. Thus, even when the travel condition at the time of regeneration control is different, the electric power generation efficiency of the motor can be improved by automatically controlling the transmission so as to produce an optional or desired rotational speed and torque. Further, it is allowed also to produce a deceleration feeling similar to the feeling in engine braking of an engine driven vehicle by changing the motor torque by regeneration control according to necessity.

In further accordance with the present invention, the drive force connecting/disconnecting device is formed of a one-way clutch capable of transmitting a drive force inputted from the engine side to the transmission side and incapable of transmitting a drive force inputted from the transmission side to the engine side.

Because the drive force connecting/disconnecting device is formed of a one-way clutch capable of transmitting the drive force inputted from the engine side to the transmission side and incapable of transmitting the drive force inputted from the transmission side to the engine side, when the rear wheel is driven by the motor, transmission of the drive force to the engine side is blocked, and it becomes possible to drive the rear wheel in a state the engine is stopped, for example. Also, even at the time of regeneration control of the motor, the engine is prevented from being rotated together, the transmission loss of the drive force is reduced, and the energy efficiency can be improved.

In accordance with another aspect of the invention, the drive force connecting/disconnecting device is formed of a multiple disc clutch or a dog clutch whose engagement/disengagement can be optionally controlled by a control section.

Because the drive force connecting/disconnecting device is formed of the multiple disc clutch or the dog clutch whose connection/disconnection can be optionally controlled by the control section, transmission of the drive force between the engine and the transmission can be optionally connected/disconnected, and, when the rear wheel is driven by the motor for example, it is allowed to travel in a state in which transmission of the drive force to the engine side is blocked and the engine is stopped.

In accordance with another aspect of the invention, the transmission is an automatic transmission capable of optionally switching a shift gear according to a command of the control section, in which the control section is configured so as to automatically control the transmission so that an optional or desired rotational speed and motor torque at which electric power generation efficiency becomes high are produced at the time of regeneration control of the motor.

Because the transmission is an automatic transmission capable of optionally switching the shift gear according to the command of the control section and the control section is configured so as to automatically control the transmission so that an optional or desired rotational speed and motor torque at which the electric power generation efficiency becomes high are produced at the time of regeneration control of the motor, the electric power generation efficiency at the time of regeneration control can be improved by shift control of the automatic transmission.

In further accordance with the present invention, the transmission is provided with a twin clutch capable of shifting between neighboring shift gears by alternately switching a connection state of a clutch on one side and a clutch on the other side.

Because the transmission is provided with the twin clutch capable of shifting between neighboring shift gears by alternately switching the connection state of the clutch on one side and she clutch on the other side, the speed can be changed without blocking the rotational drive force, therefore the speed change at the time of regeneration control becomes smooth, and the electric power generation efficiency can be easily improved.

In further accordance with the present invention, the motor is disposed on a vehicle body rear side of a crankshaft of the engine and a vehicle body upper side of the transmission in a vehicle body side view.

Because the motor is disposed on the vehicle body rear side of the crankshaft of the engine and on the vehicle body upper side of the transmission in a vehicle body side view, the motor comes to be disposed in a position generally in the center of the engine in the front/rear direction in a vehicle body side view, and the mass of a power unit can be concentrated.

In accordance with another aspect of the invention, the drive force connecting/disconnecting device is attached on one end side of the crankshaft of the engine, a generator is attached on the other end side of the crankshaft, and the twin clutch is attached on a main shaft of the transmission at an end on the opposite side in an axial direction with respect to the generator.

Because the drive force connecting/disconnecting device is attached on one end side of the crankshaft of the engine, the generator is attached on the other end side of the crankshaft, and the twin clutch is attached on the main shaft of the transmission at the end on the opposite side in the axial direction with respect to the generator, the generator and the twin clutch, which are heavy items, come to be separately arranged in the right and left in the vehicle width direction, and it is allowed to balance the weight of the vehicle in the vehicle width direction.

Also, according to another aspect of the invention, the twin clutch is arranged on the main shaft of the transmission, the drive force connecting/disconnecting device is configured so as to transmit the drive force to a primary driven gear arranged on the main shaft, the primary driven gear is configured so as to transmit the drive force to the twin clutch, and a motor output gear of the motor meshes with the primary driven gear.

Because the twin clutch is arranged on the main shaft of the transmission, the drive force connecting/disconnecting device is configured so as to transmit the drive force to the primary driven gear arranged on the main shaft, the primary driven gear is configured so as to transmit the drive force to the twin clutch, and the motor output gear of the motor meshes with the primary driven gear, it is allowed to connect the drive force connecting/disconnecting device on the motor side and the motor output gear on the motor side to the one primary driven gear, and reduction of the number of components and the weight is allowed. Also, it becomes easy to dispose the motor above the transmission, and it is allowed to prevent a crankcase of the engine from becoming large due to the provision of the motor.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
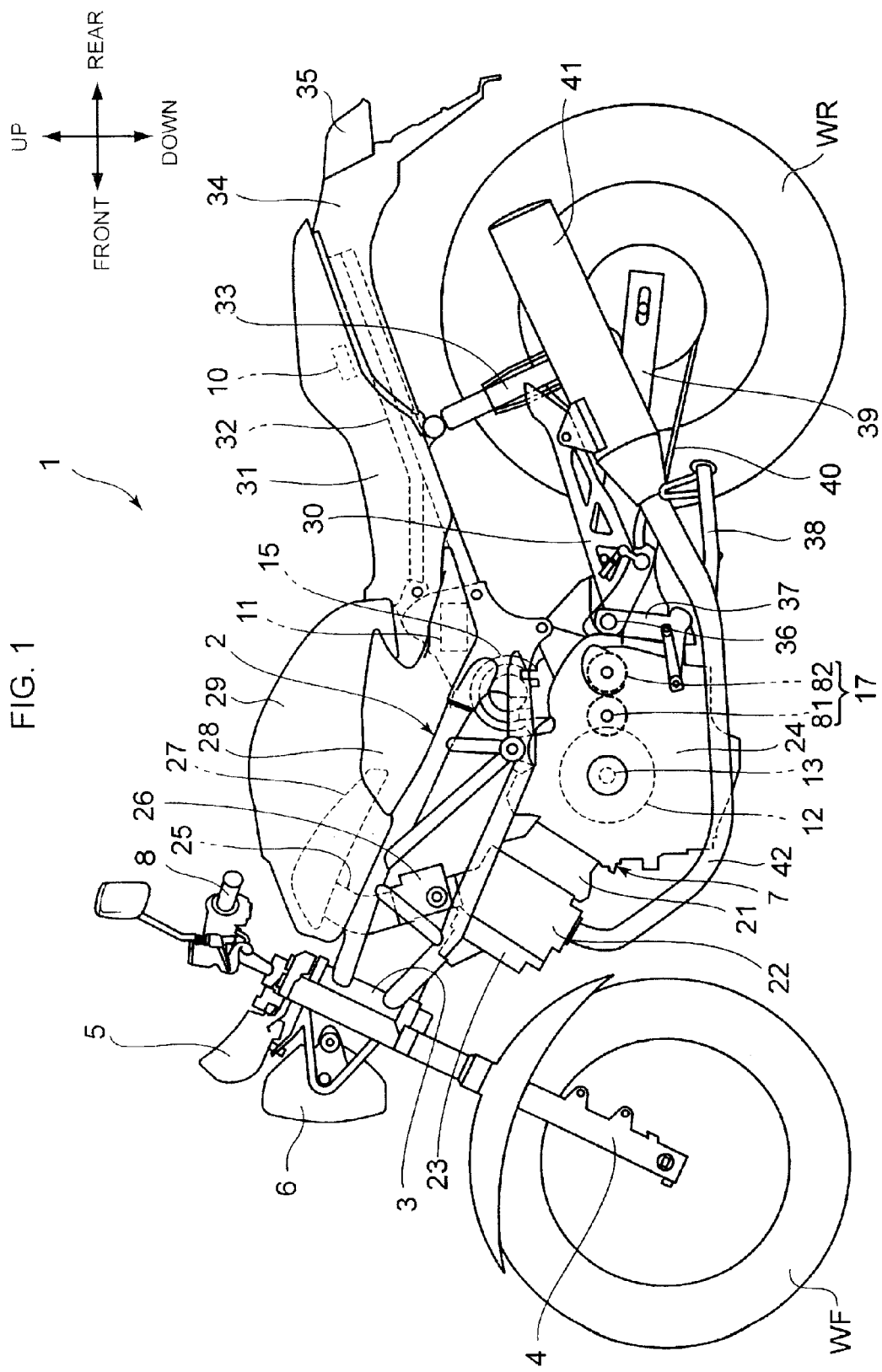
FIG. 1 is a left side view of a motorcycle applied with a hybrid vehicle driving device in relation with an embodiment of the present invention.

Below, preferred embodiments of the present invention will be described in detail referring to the drawings. FIG. 1 is a left side view of a motorcycle 1 applied with a hybrid vehicle driving device in relation with an embodiment of the present invention. The saddle-ride type motorcycle 1 is a saddle-ride type hybrid two-wheeled vehicle in which a rear wheel WR is driven by co-work of an engine 7 and a motor 15.

On the front side of a vehicle body frame 2, a head pipe 3 steerably and pivotably supporting right and left front forks 4 is arranged. To the lower end of the front forks 4, a front wheel WF is rotatably journaled, whereas to the upper end on the other side, a steering handlebar 8 is attached. On the vehicle body front side of the steering handlebar 8, a meter device 5 and a head lamp 6 executing swing action integrally with the front forks 4 are disposed.

The vehicle body frame 2 is provided with right and left main frames having a truss construction, and in the vehicle body lower part thereof, an entire power unit including the juxtaposed two-cylinder engine 7 and the motor 15 is hangingly supported. Generally in the center of a crankcase 24 of the engine 7, a crankshaft 13 oriented in the vehicle width direction is disposed. To the vehicle body front side of the crankshaft 13, a cylinder block 21 is attached. To the upper part of the cylinder block 21, a cylinder head 22 having a valve train and a cylinder head cover 23 are attached. To the intake port side of the cylinder head 22, a throttle body 26, connected to an air cleaner box 27 by a connection pipe 25, is attached, and, to the exhaust port side on the other side, an exhaust pipe 42 connected to a muffler 41 is attached. Inside the throttle body 26, a throttle valve and an injector not shown) of a fuel injection device are provided, and inside the exhaust pipe 42, a three-way catalyst is disposed.

The motor 15 driving the rear wheel WR in co-work with the engine 7 is fixed to the upper surface part of the crankcase 24 in a position behind and above the crankshaft 13 and above a transmission (automatic transmission) 17, including a main shaft 81 and a counter shaft 82.

To the rear end of the crankcase 24, right and left pivot plates 37 are fixed. By the pivot plates 37, a swing arm 39 rotatably and pivotably supporting the rear wheel WR is supported through a swing arm pivot 36. Further, by the pivot plates 37, a center stand 38 for holding the vehicle body when the vehicle stops and right and left step plates 30 supporting footrest steps for an occupant are supported. The vehicle body rear side of the swing arm 39 is suspended from the vehicle body by right and left cushion units 33. The rotational drive force of the engine 7 and the motor 15 is transmitted to the rear wheel WR through a drive chain 40.

In the upper part of the vehicle body frame 2, a fuel tank 29 and right and left side covers 28 are disposed. The air cleaner box 27 is stored in a recess formed in the front lower part of the fuel tank 29. To the rear part of the vehicle frame 2, right and left rear frames 32 are fixed. In the upper part of the rear frames 32, a seat 31 is disposed, and to the rear part thereof, a rear cowl 34 supporting a tail lamp device 35 is attached.

Below the seat 31, a battery 11 supplying the electric power when the motor 15 is driven and being charged at the time of electric power regeneration of the motor 15 by the generated electric power and a control section (ECU) 10 executing drive control of the motor 15, shift control of the transmission 17 of the engine 7, and the like are disposed.

Figure 2:
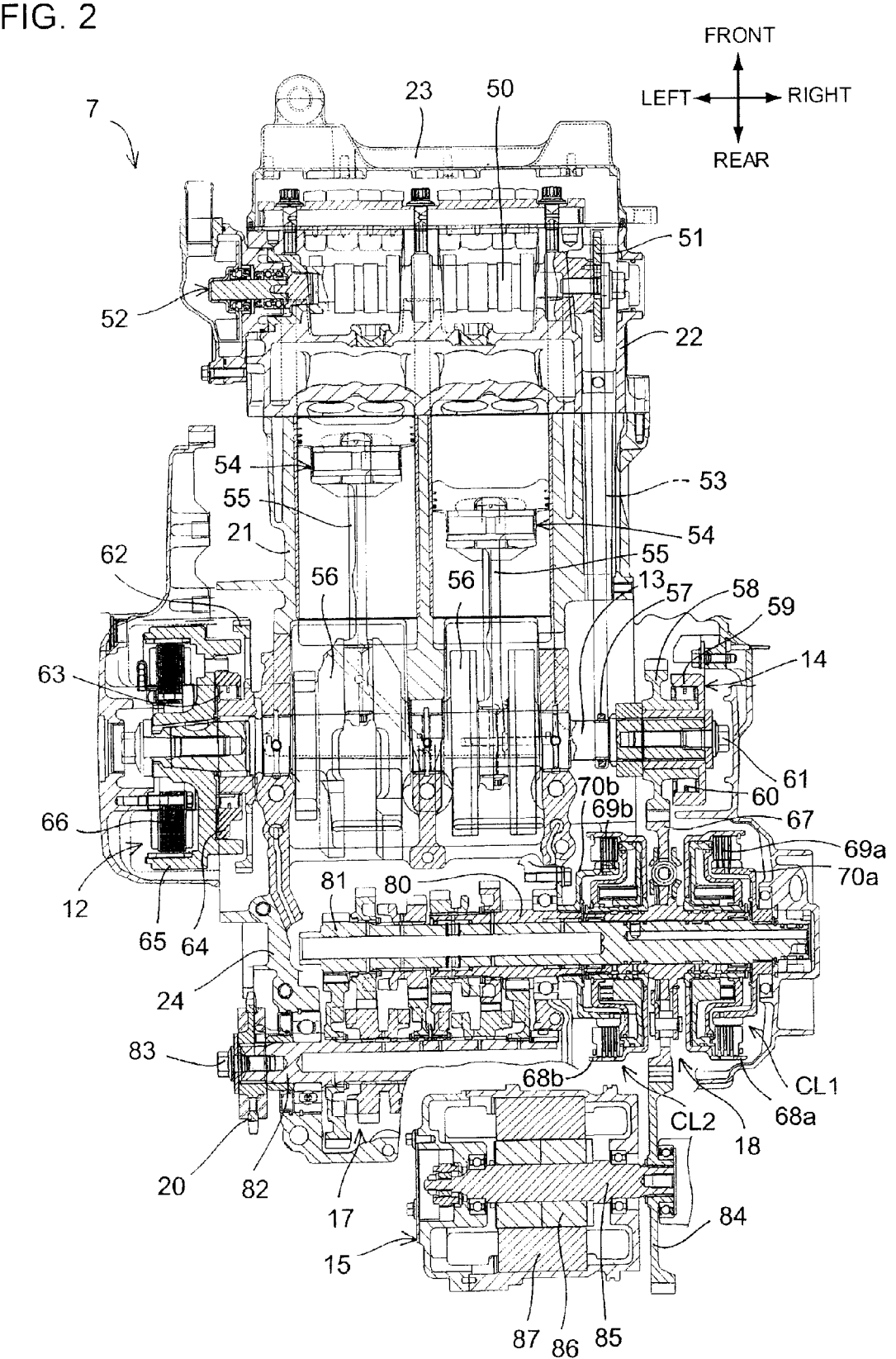
FIG. 2 is a cross-sectional view of an engine of the hybrid two-wheeled vehicle.

FIG. 2 is a cross-sectional view of the engine 7 of the hybrid two-wheeled vehicle 1 in relation with the present embodiment. A reference sign same with the above shows a same or similar part. Between crank webs 56 of the crankshaft 13, a large end of a connecting rod 55 is rotatably attached, and to a small end of the connecting rod 55, a piston 54 executing a reciprocating motion inside a cylinder formed in the cylinder block 21 is attached.

In the cylinder head 22, a cam shaft 50 driving intake and exhaust valves (not shown) is disposed. To the right end in the drawing of the cam shaft 50, a cam sprocket 51 with an endless cam chain 53 wound around is fixed. The other side of the cam chain 53 is wound around a driving gear 57 formed on the crankshaft 13. Also, the left end side in the drawing of the cam shaft 50 is connected to a water pump 52 circulating the engine cooling water.

To the left end in the drawing of the crankshaft 13, a generator 12 rotating synchronously with the crankshaft 13 is attached. The generator 12 is of an outer rotor type composed of a stator 66 fixed on the crankcase 24 side and a rotor 65 rotating on the outer peripheral side thereof.

To the right side in the drawing of the generator 12, a starting sprocket 62 for rotating the crankshaft 13 by a cell motor (not shown) for starting the engine is attached through a one-way clutch 63, 64.

To the right end in the drawing of the crankshaft 13, a one-way clutch 14 as drive force connecting/disconnecting device is attached. The one-way clutch 14 is constructed of an outer ring 59 fixed to the crankshaft 13 by a bolt 61, an engine output gear 58 rotatably journaled to the outer ring 59, and a cam mechanism 60 disposed between the outer ring 59 and the engine output gear 58. The one-way clutch 14 is configured so as to transmit the drive force to the engine output gear 58 when the drive force is inputted from the crankshaft 13, and so as not to transmit the drive force to the crankshaft 13 when the drive force is inputted from the engine output gear 58.

The engine output gear 58 meshes with a primary driven gear 67 as drive force connecting/disconnecting device attached to a main shaft as an input shaft of the transmission 17. On both sides in the axial direction of the primary driven gear 67, a twin clutch 18 as a clutch device composed of a first clutch CL1 and a second clutch CL2 is disposed. Corresponding thereto, the main shaft of the transmission 17 has a double structure composed of a cylindrical outer shaft 80 and an inner shaft 81 journaled to the outer shaft 80 in a relatively rotatable manner.

Figure 6:
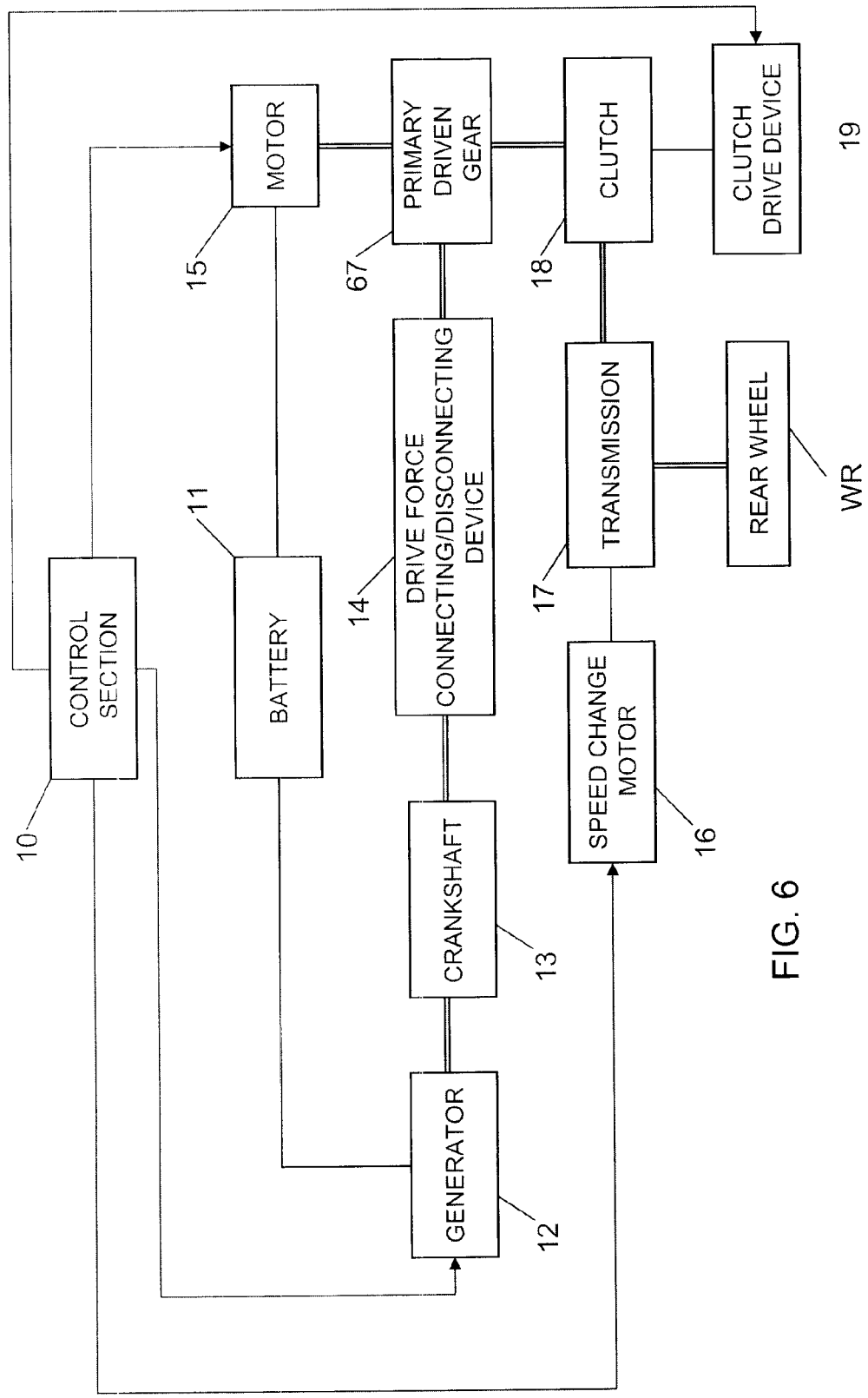
FIG. 6 is a block diagram showing a total configuration of the hybrid vehicle driving device.

The first clutch CL1 and the second clutch CL2 of the twin clutch 18 are made to be capable of automatically executing the engaging/disengaging action by clutch drive device 19 respectively controlled by the control section 10 (refer to FIG. 6). A first clutch case 68a of the first clutch CL1 and a second clutch case 68b of the second clutch CL2 are configured so as to rotate integrally with the primary driven gear 67 respectively. Also, when a friction force occurs in a clutch plate 69a of the first clutch CL1, the rotational drive force of the first clutch case 68a is transmitted to the inner shaft 81 through a first clutch support member 70a, whereas when a friction force occurs in a clutch plate 69b of the second clutch CL2, the rotational drive force of the second clutch case 68b is transmitted to the outer shaft 80 through a second clutch support member 70b.

The transmission 17 is a stepped transmission with forward six stages in which driving side gears of odd number stages of first, third and fifth speeds are unrotatably supported by the inner shaft 81, whereas driving side gears of even number stages of second, fourth and sixth speeds are unrotatably supported by the outer shaft 80. Also, the rotational drive force inputted to the primary driven gear 67 is transmitted to the inner shaft 81 when the first clutch CL1 is engaged, and is transmitted only to the outer shaft 80 when the second clutch CL2 is engaged.

Meshing of the shift gears of the transmission 17 is configured so as to be changed by a speed change motor 16 (refer to FIG. 6), and the rotational drive force whose speed is reduced with a reduction ratio corresponding to a predetermined shift gear pair is outputted from the counter shaft 82. The shift motion by the speed change motor 16 is automatically executed based on the information such as the engine speed, vehicle speed, throttle opening, and can also be optionally executed by operation of a shift switch (not shown) arranged in a steering handlebar 8 and the like.

The twin clutch type transmission is configured so as to be able to execute preliminary shift for changing meshing beforehand so that, for example, transmission of drive by the fourth speed gear is allowed while the rotational drive force is transmitted by the third speed gear. Thus, in a state the preliminary shift has been finished, by changing over of the engaging state of the first clutch CL1 and the second clutch CL2 with each other, that is, by switching the engaging state of the clutch, the shift motion to the neighboring shift stage can be finished. To the left end in the drawing of the counter shaft 82, a drive sprocket 20 transmitting the drive force to the drive chain 40 (refer to FIG. 1) is fixed by a bolt 83.

The motor 15 disposed in an upper surface part of the crankcase 24 in a position of the vehicle body upper part of the transmission 17 is of an inner rotor type composed of a rotor 86 fixed to rotary shaft 85 and a stator 87 disposed around the rotor 86. To one end of the rotary shaft 85, a motor output gear 84 is fixed, and the motor output gear 84 meshes with the primary driven gear 67.

Thus, two gears of the engine output gear 58 and the motor output gear 84 described above come to mesh with the primary driven gear 67 attached to the main shaft of the transmission 17. That is, the hybrid vehicle driving device in relation with the present embodiment is featured that the drive force of the motor 15 is joined to a point upstream the transmission 17 and downstream the one-way clutch (drive force connecting/disconnecting device) 14 in the engine drive system transmitting the rotational drive force of the crankshaft 13 to the rear wheel WR. According to these features, actions described below are achieved.

(1) In traveling by the drive force of the engine, the drive force is transmitted to the transmission through the one-way clutch. At this time, the motor rotates together with the crankshaft.

(2) In traveling by the drive force of the motor, the drive force is transmitted from the motor to the transmission. At this time, the drive force of the motor is not transmitted to the crankshaft due to the action of the one-way clutch, and therefore there is no possibility that the crankshaft is rotated together.

(3) When the drive force is not required in decelerating and traveling on a descending slope, the motor can be made to regenerate the electric power by the rotational drive force inputted from the rear wheel side. In this case, by executing shift control of the transmission, the rotational speed of the motor can be optionally changed. Further, even in regenerating the electric power, there is no possibility that the crankshaft is rotated together.

Figure 3:
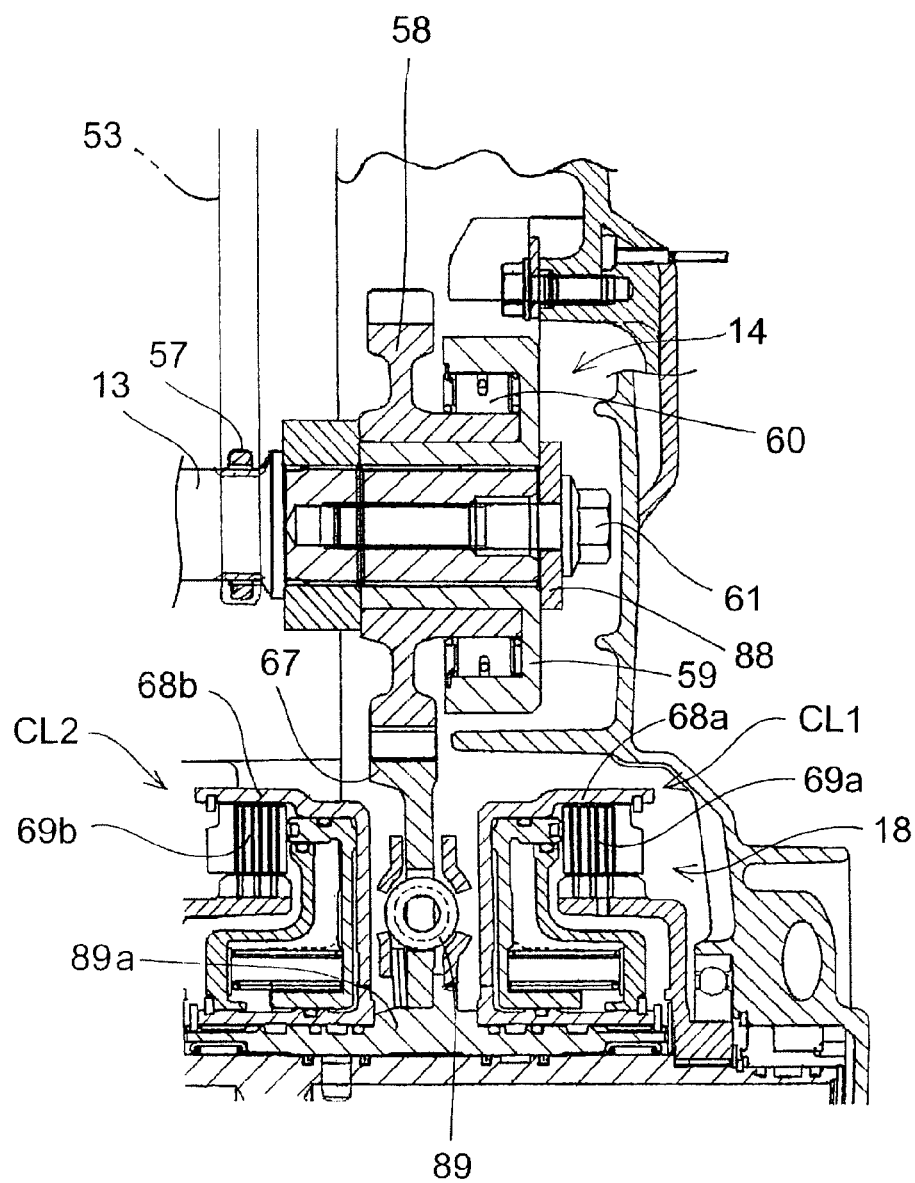
FIG. 3 is a partial enlarged view of FIG. 2 showing a configuration of drive force connecting/disconnecting device.

FIG. 3 is a partial enlarged view of FIG. 2 showing a configuration of the drive force connecting/disconnecting device. A reference sign same with the above shows a same or similar part. As described above, according to the hybrid vehicle driving device in relation with the present embodiment, the hybrid vehicle driving device including the engine drive system transmitting the drive force of the engine 7 to the transmission 17 through the one-way clutch 14 and transmitting the drive force after the speed has been changed by the transmission 17 to the rear wheel WR and the motor drive system transmitting the drive force of the motor 15 to the rear wheel WR is configured so that the drive force of the motor 15 of the motor drive system is joined to a point upstream the transmission 17 and downstream the one-way clutch 14 in the engine drive system.

More specifically, to the right end in the drawing of the crankshaft 13, the outer ring 59 is spline-fitted and is fixed by the bolt 61 through a washer 88. To the outer ring 59, the engine output gear 58 is insertingly fitted rotatably. Between the outer ring 59 and the engine output gear 58 is disposed the cam mechanism, which is capable of transmitting the rotational drive force of one direction only inputted from the outer ring 59 side to the engine output gear 58. Note that the cam mechanism 60 can be substituted by a unidirectional drive mechanism or the like.

The primary driven gear 67 is attached to a clutch case support member 89a through a plurality of dampers 89. To the clutch case support member 89a, the first clutch case 68a and the second clutch case 68b are fixed back to back with the primary driven gear 67 being interposed in between. The twin clutch 18 in relation with the present embodiment is a hydraulic clutch of a normally-open type that is switched to a connection state by supplying hydraulic pressure generated by a hydraulic pump (not shown), and the clutch drive device 19 (refer to FIG. 6) is constructed of a solenoid valve opening/closing a hydraulic passage. Also, a number of variations are possible with respect to the form of the clutch, and therefore the clutch drive device can be constructed of an actuator and the like pressingly driving the clutch support member mechanically.

In the embodiment described above, the one-way clutch 14 was used for the drive force connecting/disconnecting device, however, other mechanisms can be applied instead of the one-way clutch. Below, variations of the drive force connecting/disconnecting device will be described referring to FIG. 4 and FIG. 5.

Figure 4:
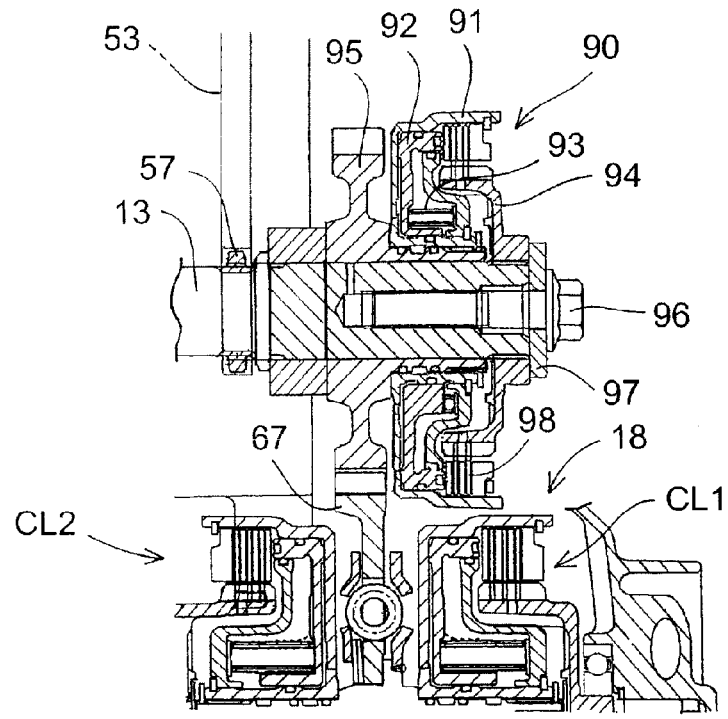
FIG. 4 is an enlarged view showing a first variation of the drive force connecting/disconnecting device.

FIG. 4 is an enlarged view showing a first variation of the drive force connecting/disconnecting device. A reference sign same with the above shows a same or similar part. In the first variation, as the drive force connecting/disconnecting device, a multiple disc clutch 90 of a normally-open type whose engagement/disengagement is optionally controlled by the control section 10 is applied.

To the right end in the drawing of the crankshaft 13, a clutch support member 94 is spline-fitted and is fixed by a bolt 96 through a washer 97. To the left side in the drawing of the clutch support member 94, an engine output gear 95 is rotatably journaled, and a clutch case 91 is fixed to the outer periphery of a cylindrical part of the engine output gear 95. To the inner peripheral part of the clutch case 91, a hydraulic piston 92 is inserted through a seal member. The hydraulic piston 92 slides to the right in the drawing resisting an energizing force of a return spring 93 by supply of the connected hydraulic pressure, a friction force is thereby generated in clutch plates 98, and the rotational drive force of the crankshaft 13 is transmitted to the engine output gear 95.

According to the drive force connecting/disconnecting device by the multiple disc clutch 90, action similar to that of the one-way clutch becomes possible, a half-clutch state is generated in engaging and disengaging the clutch and variation of the drive force in engaging/disengaging can be reduced.

Figure 5:
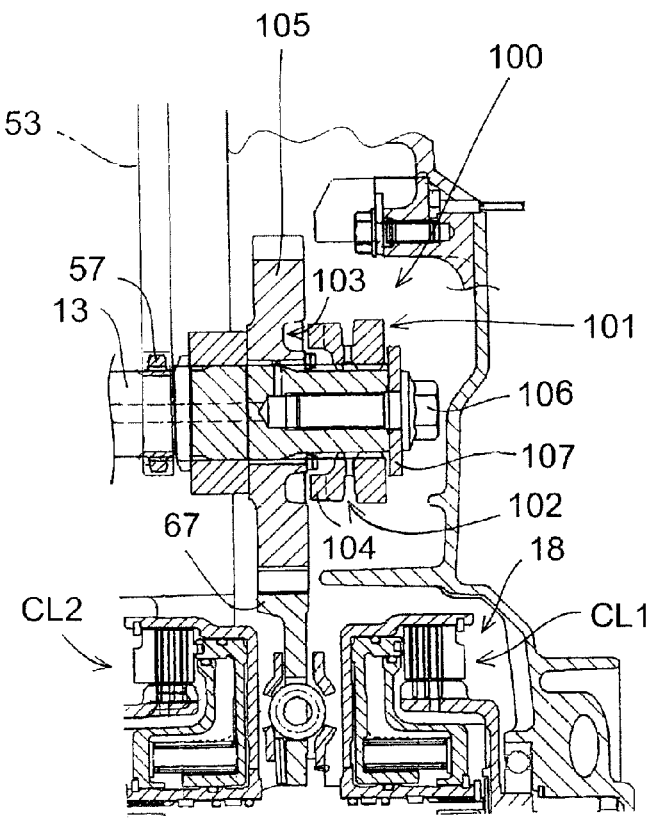
FIG. 5 is an enlarged view showing a second variation of the drive force connecting/disconnecting device.

FIG. 5 is an enlarged view showing a second variation of the drive force connecting/disconnecting device. A reference sign same with the above shows a same or similar part. In the second variation, as the drive force connecting/disconnecting device, a dog clutch 100 whose engagement/disengagement is controlled optionally by the control section 10 is applied.

To the right end in the drawing of the crankshaft 13, a sleeve 102 having a plurality of dogs 104 projecting in the axial direction is spline-fitted slidably in the axial direction and is fixed by a bolt 106 through a washer 107. To the left side in the drawing of the sleeve 102, an engine output gear 105 formed with a plurality of dog holes 103 is fixed. When the sleeve 102 is slid to the left in the drawing by the drive force of the actuator 101 and the like, the dog 104 engages with the dog hole 103 and is switched to a drive force transmitting state. According to the drive force connecting/disconnecting device by the dog clutch 100, transmission of the drive force with less loss is allowed.

FIG. 6 is a block diagram showing a total configuration of a hybrid vehicle driving device. A reference sign same with the above shows a same or similar part. As described using FIG. 2, the generator 12 is arranged in one end of the crankshaft 13, and the drive force connecting/disconnecting device 14 is arranged in the other end. The drive force connecting/disconnecting device meshes with the primary driven gear 67, the clutch device (twin clutch) 18 is connected to the primary driven gear 67, and the output gear of the motor 15 meshes with the primary driven gear 67.

The clutch device 18 is subjected to engagement/disengagement control by the clutch drive device 19, which is controlled by the control section 10, and the transmission 17 is subjected to shift control by the speed change motor 16, which is controlled by the control section 10. The battery 11 is connected to the generator 12 and the motor 15, and the control section 10 executes drive and electric power regeneration control of the motor 15 and power generation control of the generator 12.

Figure 7A:
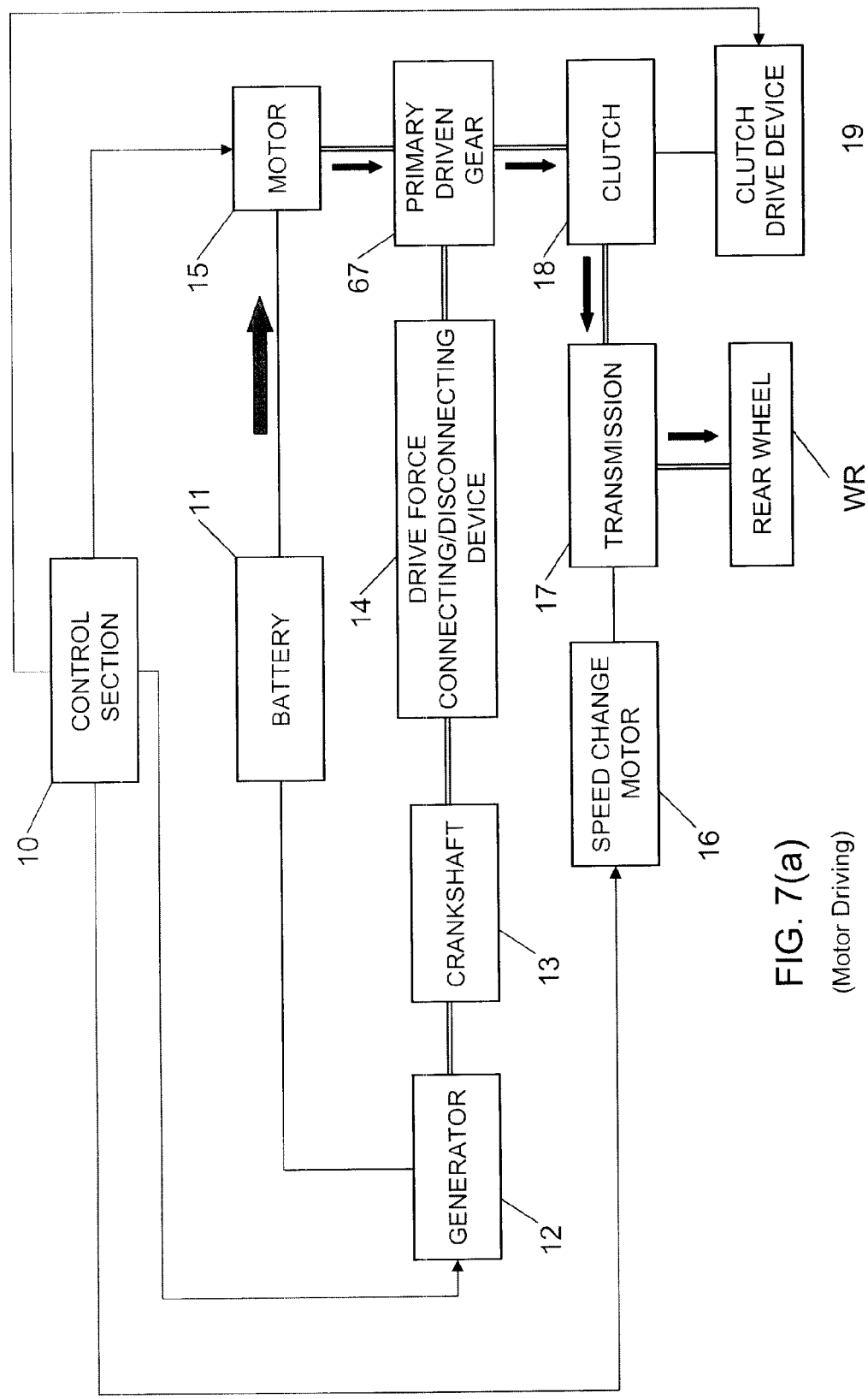
FIGS. 7(a) and 7(b) are block diagrams showing a transmission route of drive force in driving a motor and a transmission route of the drive force in motor regeneration controlling, respectively.
Figure 7B:
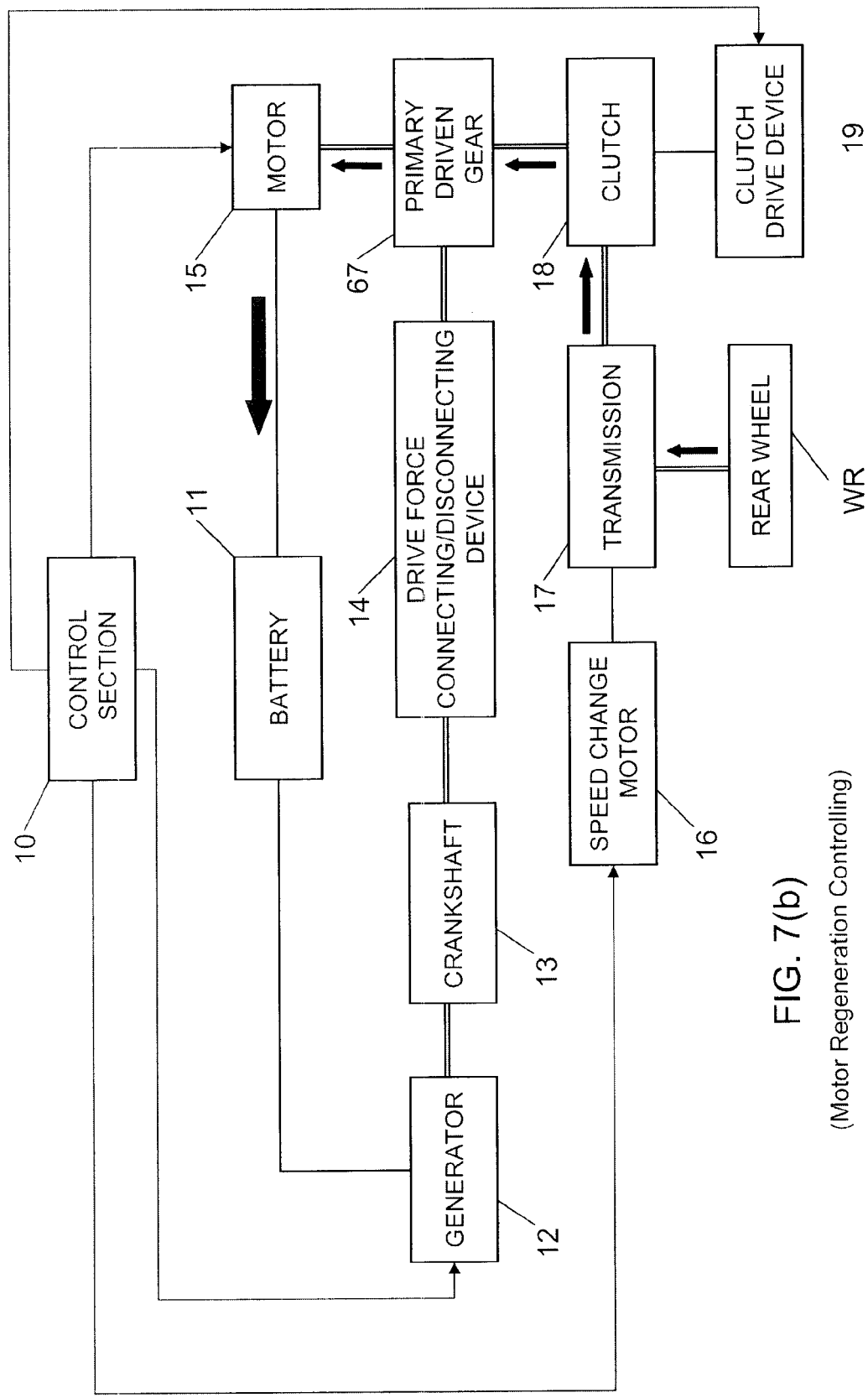

FIG. 7(a) is a block diagram showing a transmission route of the drive force in driving a motor. FIG. 7(b) is a block diagram showing a transmission route of the drive force in motor regeneration controlling. A reference sign same with the above shows a same or similar part. In driving the motor shown in FIG. 7(a), the motor 15 is driven by the electric power supplied from the battery 11, and the rotational drive force thereof is transmitted in the order of primary driven gear 67, clutch device 18, transmission 17, and rear wheel WR. At this time, because of the action of the drive force connecting/disconnecting device 14, the drive force of the motor 15 is not transmitted to the crankshaft 13.

On the other hand, in motor regeneration controlling shown in FIG. 7(b), the drive force is transmitted in the order of rear wheel WR, transmission 17, clutch device 18, primary driven gear 67, and motor 15. At this time, the control section 10 can charge the battery 11 by electric power regeneration of the motor 15. In this case also, because the drive force is not transmitted to the crankshaft 13 due to the action of the drive force connecting/disconnecting device 14, the loss caused by rotation of the crankshaft 13 is avoided.

Further, according to the hybrid vehicle driving device in relation with the present invention, in both cases of during traveling by the drive force of the motor 15 and during regeneration control of the motor 15, the shift motion by the transmission 17 is possible. Thus, by adjusting the rotational speed of the motor 15 by shifting to an optional shift stage during regeneration control in particular, the electric power generation efficiency in regeneration control can be improved.

Figure 8:
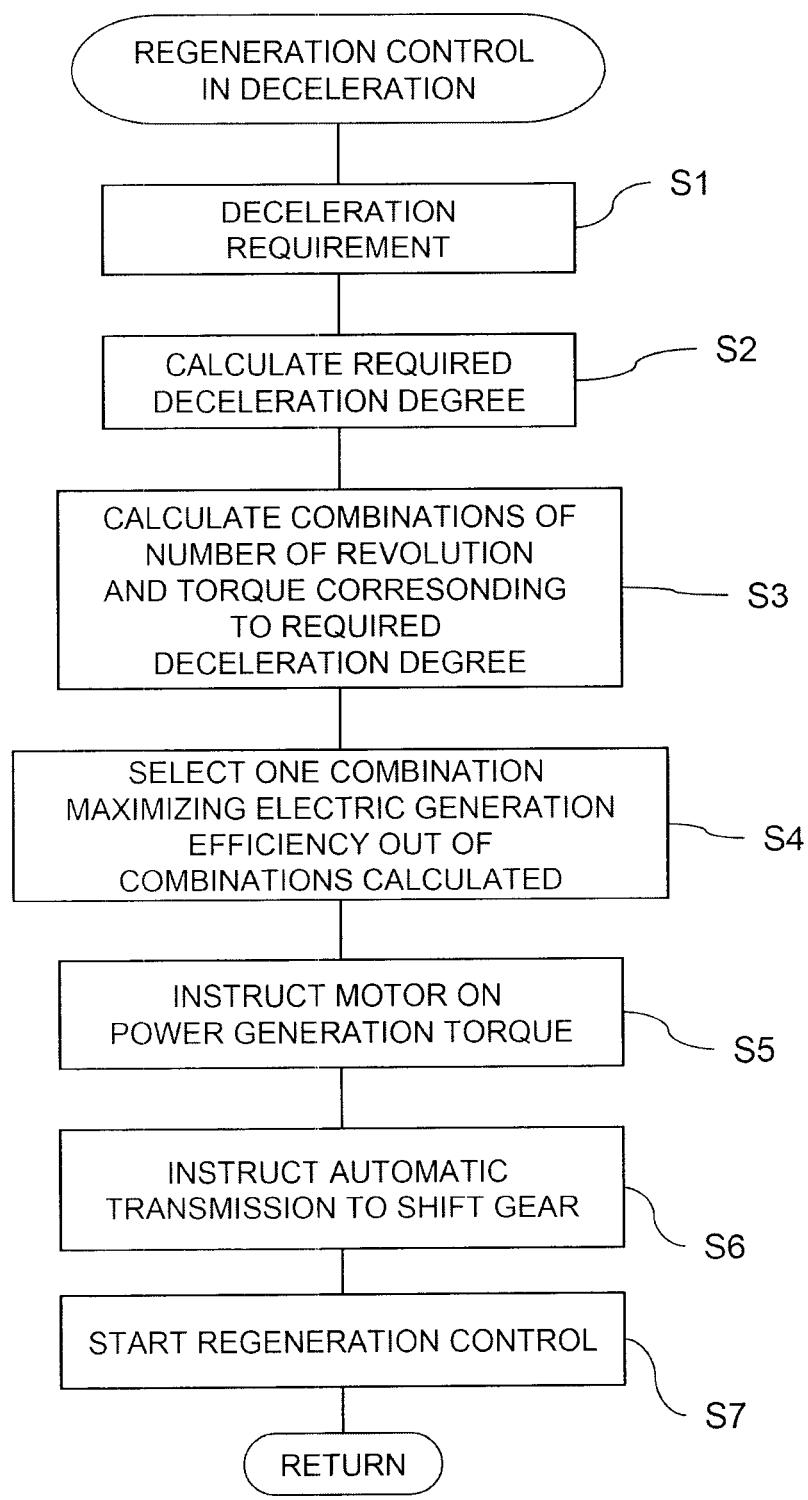
FIG. 8 is a flowchart showing a procedure of regeneration control in deceleration in relation with the present embodiment; and, FIG. 9 is a graph showing a relation between the number of revolution of the motor, motor torque, and electric power generation efficiency.

FIG. 8 is a flowchart showing a procedure of regeneration control in deceleration in relation with the present embodiment. When a deceleration requirement is raised in step S1, the process proceeds to step S2 and required deceleration degree is calculated. The deceleration requirement device the events of closing a throttle, executing a brake operation and the like for example, rod the required deceleration degree is calculated taking the information of a vehicle speed sensor, an inclination angle sensor and the like also into consideration.

In step S3, combinations of the number of revolution of the motor and the motor torque corresponding to the required deceleration degree are calculated, and, in step S4 that follows, one combination maximizing the electric power generation efficiency is selected out of the combinations calculated. Here, reference is made to the graph of FIG. 9.

Figure 9:
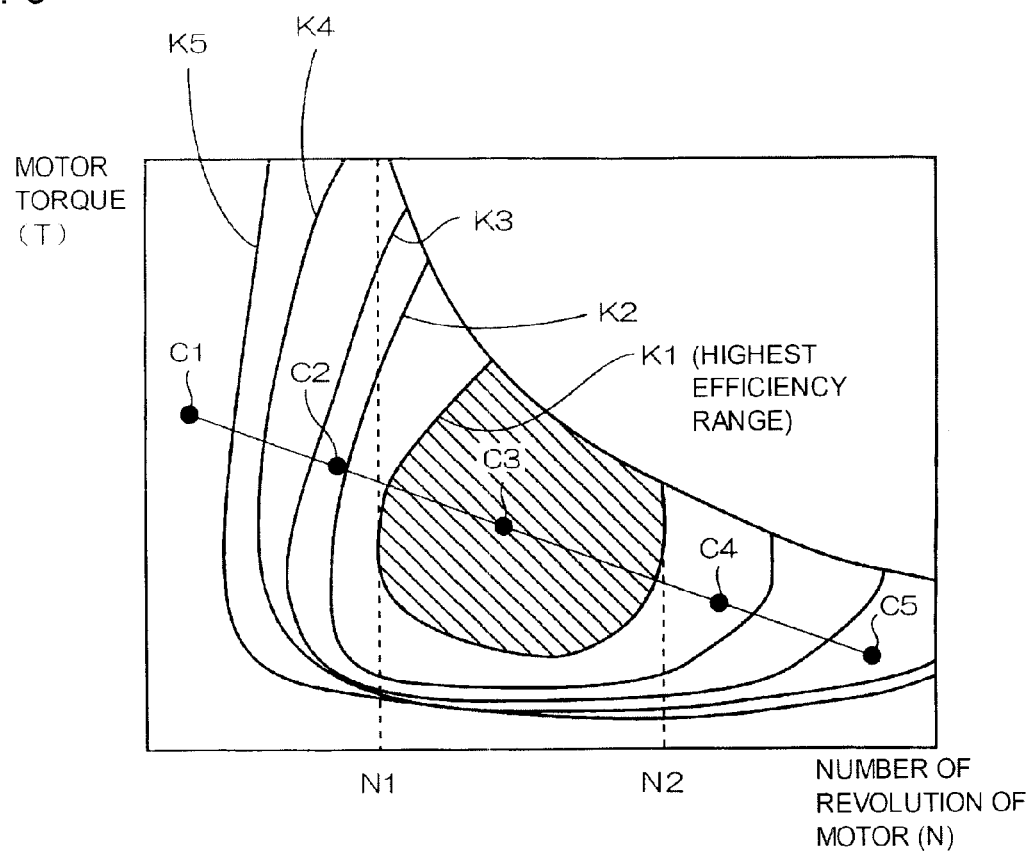

FIG. 9 is a graph showing the relation between the number of revolution of the motor, motor torque, and electric power generation efficiency. As described above, the electric power generation efficiency in regeneration control of the motor 15 correlates with the number of revolution of the motor (rotational speed) and the motor torque. In the graph, the efficiency of the maximum efficiency range K1 is exerted within a predetermined range of the number of revolution of the motor N1-N2, whereas as the number of revolution of the motor departs from the predetermined range of N1-N2, the electric power generation efficiency comes to drop under the relation of K2>K3>K4>K5.

On the other hand, in the hybrid vehicle driving device in relation with the present embodiment, the electric power generation efficiency can be maintained at an excellent state at all times by automatic shift control of the transmission 17. More specifically, in step S3 of FIG. 8, combinations of the number of revolution of the motor and motor torque corresponding to the required deceleration degree are calculated as C1-C5 in the graph, however, in step 4, C3 maximizing the electric power generation efficiency comes to be selected out of these five combinations.

Coming back to the flowchart of FIG. 8, in step S5, the electric power generation torque is instructed to the motor 15 by the control section 10 based on the combination C3 maximizing the electric power generation efficiency. Then, shifting to an appropriate shift stage is instructed to the automatic transmission 17 in step S6, regeneration control by the motor 15 is started in step S7, and a series of control is finished.

As described above, according to the hybrid vehicle driving device in relation with the present invention, in the hybrid vehicle driving device including the engine drive system transmitting the drive force of the engine 7 to the transmission 17 through the one-way clutch 14 or the drive force connecting/disconnecting device capable of optionally connecting/disconnecting and transmitting the drive force after shifting by the transmission 17 to the rear wheel WR and the motor drive system transmitting the drive force of the motor 15 to the rear wheel WR, the drive force of the motor 15 of the motor drive system is joined to a point upstream the transmission 17 and downstream the one-way clutch 14 or the drive force connecting/disconnecting device capable of optionally connecting/disconnecting in the engine drive system, and therefore, at the time of regeneration control of the motor in deceleration and the like, it is allowed to change the speed of the rotational drive force of the rear wheel WR by the transmission 17 and to rotate the motor at an optional rotational speed. Thus, even when the traveling state at the time of regeneration control is different, it is allowed to automatically control the transmission so as to produce an optional rotational speed and torque and to improve the electric power generation efficiency of the motor.

Note that the configuration and the like of the transmission, clutch device, drive force connecting/disconnecting device is not limited to the embodiments described above, and a variety of alterations are possible. The hybrid vehicle driving device in relation with the present invention can be applied not only to a hybrid two-wheeled vehicle but also to a variety of hybrid vehicles such as saddle-ride type three/four-wheeled vehicles and the like.

What is claimed is:

1. A hybrid vehicle driving device comprising:
an engine drive system transmitting drive force of an engine to a multi-speed transmission through a drive force connecting/disconnecting device and transmitting the drive force after shifting by the multi-speed transmission to a rear wheel, said drive force connecting/disconnecting device comprises a clutch whose engagement/disengagement is controlled by a control section; and
a motor drive system transmitting a drive force of a motor to the rear wheel,
wherein the drive force of the motor of the motor drive system is joined to a point upstream the multi-speed transmission and downstream the drive force connecting/disconnecting device in the engine drive system;
the multi-speed transmission is an automatic transmission capable of optionally switching a shift gear according to a command of the control section; and
the control section is configured, during regeneration control through back driving of the motor, to:
control the clutch to disengage so as to not transmit drive force inputted from the transmission side to the engine side; and,
automatically control the multi-speed transmission so that a shift gear is selected such that rotational speed and torque of the motor at which electric power generation efficiency becomes high are produced.

2. The hybrid vehicle driving device according to claim 1, wherein clutch comprises a multiple disc clutch or a dog clutch.

3. The hybrid vehicle driving device according to claim 1, wherein the multi-speed transmission is provided with a twin clutch capable of shifting between neighboring shift gears by alternately switching a connection state of a clutch on one side and a clutch on the other side.

4. The hybrid vehicle driving device according to claim 3, wherein:
the drive force connecting/disconnecting device is attached on one end side of the crankshaft of the engine;
a generator is attached on the other end side of the crankshaft; and
the twin clutch is attached on a main shaft of the multi-speed transmission at an end on the opposite side in an axial direction with respect to the generator.

5. The hybrid vehicle driving device according to claim 3, wherein:
the twin clutch is arranged on the main shaft of the multi-speed transmission;
the drive force connecting/disconnecting device is configured so as to transmit the drive force to a primary driven gear arranged on the main shaft;
the primary driven gear is configured so as to transmit the drive force to the twin clutch; and
a motor output gear of the motor meshes with the primary driven gear.

6. The hybrid vehicle driving device according to claim 1, wherein the motor is disposed on a vehicle body rear side of a crankshaft of the engine and a vehicle body upper side of the multi-speed transmission in a vehicle body side view.

7. A hybrid vehicle driving device comprising:
an engine drive system transmitting drive force of an engine to a multi-speed transmission through a drive force connecting/disconnecting device and transmitting the drive force after shifting by the multi-speed transmission to a rear wheel, said drive force connecting/disconnecting device comprises a one way clutch capable of transmitting a drive force inputted from the engine side to the transmission side and incapable of transmitting a drive force inputted from the transmission side to the engine side; and
a motor drive system transmitting a drive force of a motor to the rear wheel,
wherein the drive force of the motor of the motor drive system is joined to a point upstream the multi-speed transmission and downstream the drive force connecting/disconnecting device in the engine drive system;
the multi-speed transmission is an automatic transmission capable of optionally switching a shift gear according to a command of the control section; and
the control section is configured during regeneration control of the motor wherein the drive force is transmitted back from the rear wheel to the motor, to automatically control the multi-speed transmission so that the shift gear is selected such that a rotational speed and torque of the motor at which electric power generation efficiency becomes high are produced.

8. The hybrid vehicle driving device according to claim 7, wherein the multi-speed transmission is provided with a twin clutch capable of shifting between neighboring shift gears by alternately switching a connection state of a clutch on one side and a clutch on the other side.

9. The hybrid vehicle driving device according to claim 8, wherein:
the drive force connecting/disconnecting device is attached on one end side of the crankshaft of the engine;
a generator is attached on the other end side of the crankshaft; and
the twin clutch is attached on a main shaft of the multi-speed transmission at an end on the opposite side in an axial direction with respect to the generator.

10. The hybrid vehicle driving device according to claim 8, wherein:
the twin clutch is arranged on the main shaft of the multi-speed transmission;
the drive force connecting/disconnecting device is configured so as to transmit the drive force to a primary driven gear arranged on the main shaft;
the primary driven gear is configured so as to transmit the drive force to the twin clutch; and
a motor output gear of the motor meshes with the primary driven gear.

* * * * *